United States Patent [19]

McMahan

[11] Patent Number: 4,970,629
[45] Date of Patent: Nov. 13, 1990

[54] HEADLAMP ASSEMBLY
[75] Inventor: David R. McMahan, Anderson, Ind.
[73] Assignee: General Motors Corporation, Detroit, Mich.
[21] Appl. No.: 361,083
[22] Filed: Jun. 5, 1989
[51] Int. Cl.⁵ .............................................. B60Q 1/00
[52] U.S. Cl. ...................................... 362/61; 362/419; 362/287; 33/288; 33/644; 356/249
[58] Field of Search ................... 302/61, 80, 419, 418, 302/205, 287; 33/288, 333, 370, 374, 375, 379, 644, 645, 678; 356/249

[56] References Cited
U.S. PATENT DOCUMENTS 2,058,743 10/1936 Trippe .................................. 362/311
3,612,854 10/1971 Todd et al. ........................... 362/269
4,794,495 12/1988 McMahan et al. ................... 362/419
4,802,067  1/1989 Ryder et al. ............................ 362/61

FOREIGN PATENT DOCUMENTS 192688 11/1906 Fed. Rep. of Germany ...... 356/249

Primary Examiner—Ira S. Lazarus
Assistant Examiner—D. M. Cox
Attorney, Agent, or Firm—Edward J. Biskup

[57] ABSTRACT

A headlamp assembly having a retainer member supporting a rectangular lamp unit and provided with a level device that is capable of being adjusted relative to the retainer member by a screw located between one of the sections of the retainer member and the level device.

5 Claims, 2 Drawing Sheets

HEADLAMP ASSEMBLY

This invention concerns headlamps in general and more particularly concerns a headlamp assembly having a level device attached thereto.

In the preferred form, the headlamp assembly according to the present invention is adapted to be mounted to a support panel at the front end of a vehicle and includes a rectangular lamp unit formed with a radially outwardly extending flange which surrounds the lamp unit adjacent to the lens thereof. The flange is provided with an outer vertical surface which has three aiming pads formed thereon that define an aiming plane. A rectangular retainer member supports the lamp unit and has a configuration which conforms to the shape of the flange of the lamp unit. The retainer member comprises a pair of vertically spaced horizontal sections and a pair of horizontally spaced vertical sections all of which are interconnected to form a rectangular ring-like member. Each of the sections is L-shaped in cross-section having a first wall located in a common substantially vertical plane and a second wall which lies in a plane which is substantially perpendicular to the first wall. The horizontal sections have integral tabs formed therewith which are secured to a housing for maintaining the lamp unit within the retainer member with the aiming pads contacting the first wall of at least two of the sections. Also, one of the sections has an enlarged portion provided with an elongated opening the major axis of which is substantially parallel to the major axis of the associated section. A level device is carried by the enlarged portion and has a part thereof visible through the elongated opening so as to provide a view of the gas bubble of the leveling device so proper aim of the lamp unit can be observed from the front of the headlamp assembly. In addition, screw means are provided between the leveling device and the associated section for making minor adjustments of the position of the level device relative to the retainer member.

The objects of the present invention are to provide a new and improved headlamp assembly having a retainer ring for supporting a lamp unit and which includes a level device that allows the lamp unit to be readily adjusted about a horizontal aim axis; to provide a new and improved headlamp assembly which includes a retainer member that receives the flange of a lamp unit and includes a level device that is visible through an opening formed in a frontal portion of the retainer member so as to facilitate aiming of the lamp unit in a vertical plane; to provide a new and improved headlamp assembly having a retainer ring that cooperates with the aiming pads on a lamp unit and a level device secured to the retainer member for properly aiming the lamp unit and that has a viewing face extending through an opening formed in the frontal portion of the retainer ring for providing a view of the bubble of the level device during the aiming procedure of the headlamp assembly; and to provide a new and improved headlamp assembly having a retainer member that carries a level device that includes an adjustment screw for positioning the level device relative to the retainer member and in which the retainer member has a pair of vertically spaced horizontal sections and a pair of horizontally spaced vertical sections.

Other objects and advantages of the present invention will be more apparent from the following detailed description when taken with the drawings in which FIG. 1 is a front elevational view showing a headlamp assembly according to the present invention;

Figure 1:
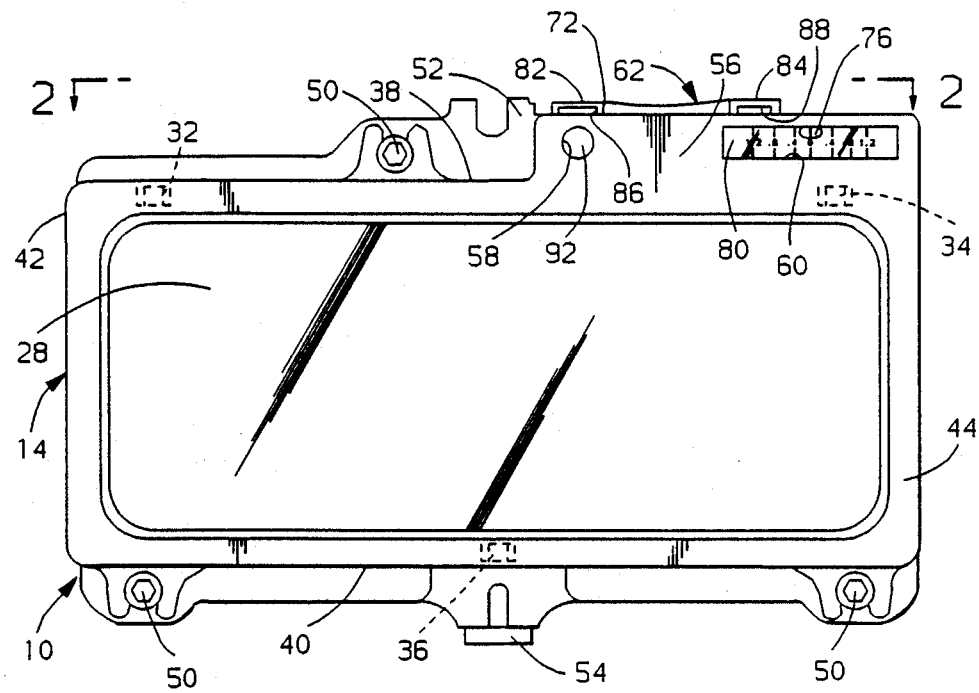
Figure 2:
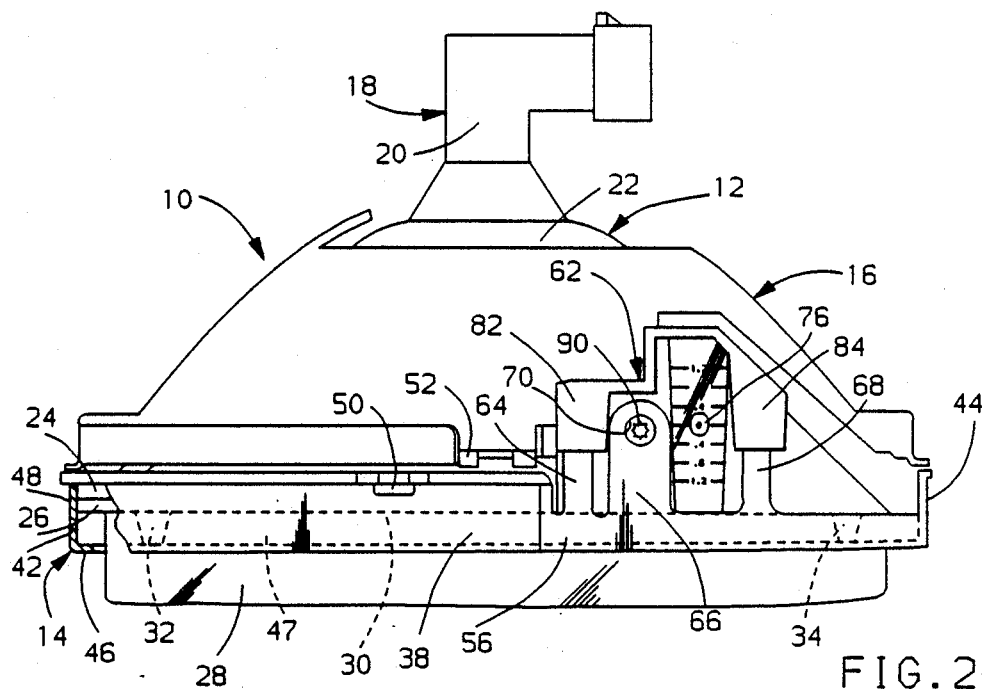
FIG. 2 is a top plan view partly in section taken on line 2—2 of FIG. 1 of the headlamp assembly.

Referring now to the drawings and more particularly to FIGS. 1 and 2 thereof, a headlamp assembly 10 made according to the present invention is shown that can be mounted to a support panel (not shown) which forms a part of the front end of a motor vehicle. In this regard, one type of mounting that the headlamp assembly can be used with is seen in U.S. Pat. No. 4,794,495 entitled "Headlamp Assembly" issued on Dec. 27, 1988, and assigned to the assignee of this invention. The headlamp assembly 10 includes a lamp unit 12 supported between a retainer member 14 and a housing 16 which, in turn, can be connected to the support panel by a pair of pivot members, a screw device and a spring means as seen in the aforementioned patent.

More specifically, the lamp unit 12 incorporated in the headlamp assembly 10 is a so-called mini-lamp which, in this case, takes the form of an all glass rectangular sealed beam unit having a body portion provided with a parabolic cavity, the inner concave surface (not shown) of which is aluminized so as to serve as a reflector. A plug-type high-efficiency light bulb 18 has its bulb portion located within the cavity and its plug portion 20 sealed to the body portion 22 of the lamp unit 12 with the filament of the light bulb 18 suitably positioned to provide the desired light beam which can be either a high beam or a low beam. The front of the body portion 22 is formed with a rim 24 which is fused to a complementary rim 26 of a lens 28 so as to provide a radially outwardly extending flange which completely surrounds the frontal portion of lamp unit 12. The flange has a vertical face 30 provided with three aiming pads 32, 34 and 36 the terminal ends of which define an aiming plane which is perpendicular to the optical axis of the lamp unit 12.

The retainer member 14 is a metal stamping having a configuration conforming to the rectangular configuration of the flange on the lamp unit 12 and comprises a pair of vertically spaced top and bottom sections 38 and 40, respectively which are horizontally oriented as seen in FIG. 1. The top and bottom sections 38 and 40 are connected at their opposed ends to a pair of horizontally spaced and vertically oriented side sections 42 and 44. As seen in FIG. 2, each of the sections is L-shaped in cross-section and consists of a first wall 46 having a flat rear surface 47 located in a common substantially vertical plane and a second wall 48 having a flat surface which lies in a plane perpendicular to the first wall 46. The lamp unit 12 is supported by the retainer member 14 and, in this regard, note that its flange is located within the sections 38, 40, 42 and 44 of the retainer member 14. Although not shown, the housing 16 is provided with a plurality of spring tabs which, when the three screws 50 fasten the retainer member 14 to the housing 16, serve to engage the rear of the flange of the lamp unit and press it forwardly so as to cause the aiming pads 32, 34 and 36 to contact the surface 47 of the first wall 46 of each section 38–44. As aformentioned, the surface 47 of the sections 38–44 is in a common plane and therefore, with the terminal ends of the aiming pads 32–36 contacting the surface 47, the retainer member 14 becomes an aiming ring. Also, although not shown, each of the side sections 42 and 44 is formed with a curved portion located midway between the ends of the associated side section. The curved portion of the sections 42 and 44 cooperate with the pivot members seen in the aforementioned U.S. patent for supporting the retainer member and, in turn, the lamp unit 12 for adjustable movement in a vertical plane about a horizontal aim axis. In this regard, the top portion of the housing 16 is formed with an outstanding and integrally formed bracket 52 having a U-slot which receives the usual annular slot formed in the head of the adjustment screw for connecting the headlamp assembly 10 to the support panel of the vehicle. In addition, the bottom portion of the housing 16 has an integrally formed bracket 54 to which can be attached the front end of the coil spring, the rear end of which is secured to the support panel as seen in the aforementioned patent.

Figure 5:
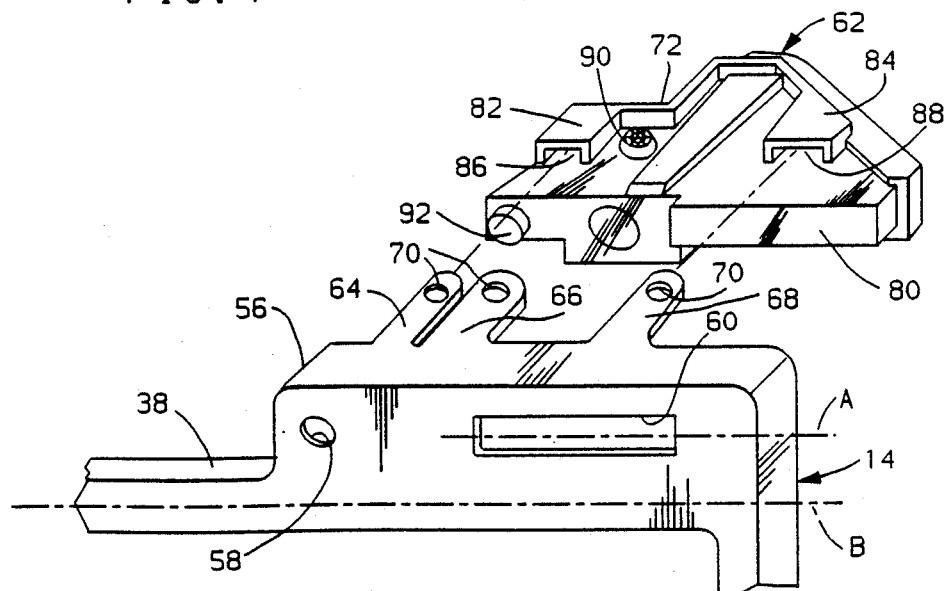
FIG. 5 is an exploded perspective view of the level device and a portion of the retainer member which forms a part of the headlamp assembly seen in FIGS. 1 and 2.

The top section 38 of the retainer member 14 is formed with an enlarged portion 56 having a circular opening 58 and a rectangular opening 60, the major or central axis A of which is parallel to the major central axis B of the top section 38. As will be more fully explained hereinafter, the rectangular opening 60 serves as a window allowing a view of a level device 62 secured to the retainer member 14. Also, as seen in FIGS. 2 and 5, the top section 38 has three parallel and integrally formed and rearwardly extending tangs 64, 66 and 68, each of which is formed with a circular opening 70.

Figure 3:
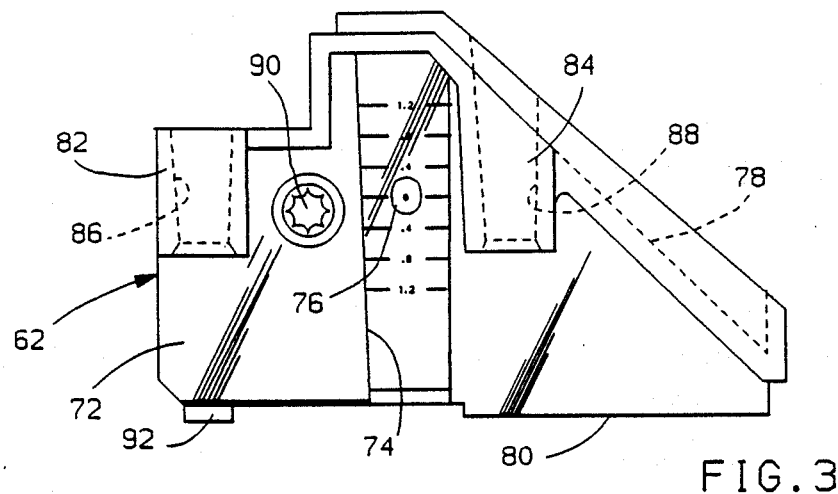
FIG. 3 is an enlarged view of the level device which forms a part of the headlamp assembly of FIGS. 1 and 2.
Figure 4:
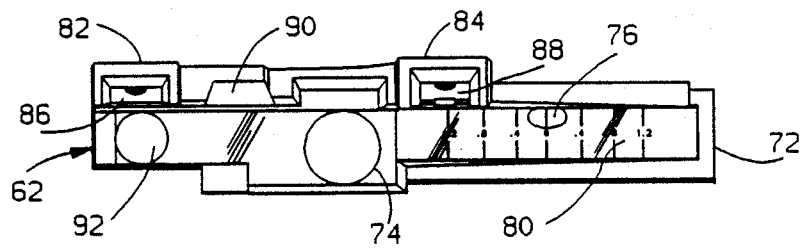
FIG. 4 is a front elevational view of the level device seen in FIG. 3.

The level device 62 has a clear plastic body 72 and has a closed cylindrical chamber 74 formed therein. The level device 62, when assembled to the retainer member 14, is adjusted to have the longitudinal center axis of the chamber 74 perpendicular to the plane of the surface 47 of the sections 38–44 of the retainer member 14. As seen in FIG. 3 and as is conventional the chamber 74 is filled with a viscous fluid entrapping a gas bubble 76 which moves within the confines of the chamber 74 as the level device 62 moves with the attached retainer member about a horizontal axis. As is conventional with leveling devices, the chamber 74 has a slight internal arc providing a high point midway in the chamber as indicated by the marking "0". Thus, when the gas bubble 76 is located at the marking "0", as seen in FIG. 3, the retainer member 14 and accordingly the lamp unit 12 is in proper aim in a vertical plane. As seen in FIG. 1, the gas bubble 76 is located at the marking "0" and therefore in proper aim. One feature of the level device 62 is that it has a polished flat surface along edge 78 which is at an angle of 45° relative to the front viewing surface along edge 80. The polished surface is positioned so that as seen in FIG. 4 where the level device 62 is viewed from its front end the chamber 74 is reflected to the front surface along edge 80 and by appropriately located markings on the front surface one can determine whether the lamp unit 12 is properly aimed in the manner taught by the aforementioned patent. Accordingly, the level device 62 not only permits the proper aim about a horizontal axis to be observed from above the headlamp assembly 10 but also from the front thereof.

The upper surface of the body 72 of the level device 62 is integrally formed with a pair of parallel rectangular bosses 82 and 84 which are respectively formed with through slots or pockets 86 and 88 each of which has a circular pin (not shown) formed therein. In addition, the upper surface of the body 72 has a screw 90 threaded therein and a cylindrical locator pin 92 formed on the frontal face of the body 72. As seen in FIGS. 2 and 5, during assembly of the level device 62 with the retainer member 14, the slots 86 and 88 receive the tangs 64 and 68, respectively, and the pins within the latter mentioned slots engage the associated openigns 70 and lock the level device 62 to the retainer member 14. At the same time, the locator pin 92 enters the opening 58, the viewing face 80 enters the rectangular opening 60, and the tang 66 is located above the head of the screw 90. In this regard, inasmuch as the head of the screw 90 is frusto-conical in configuration, the top part of the head extends partially into the opening 70 formed to the tang 66. Thus, when the level device 62 is fully assembled to the retainer member 14, the parts of each are located as seen in FIGS. 1 and 2. Prior to assembly with the lamp unit 12, the retainer member 14 can be placed in a test fixture to assure that the bubble 76 is located at the "0" marking, as seen in FIGS. 1 and 2, when the surface 47 of wall 46 is located in a vertical plane. Any minor adjustment required of the level device 62 can be realized by rotating the screw 90 with a proper tool in one direction or the other to achieve proper positioning of the bubble at the "0" marking.

Various changes and modifications can be made in the construction of this headlamp assembly without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A headlamp assembly adapted to be mounted to a support panel of a vehicle, said headlamp assembly including a lamp unit formed with a radially outwardly extending flange provided with a vertical surface having three aiming pads formed thereon that define an aiming plane, a retainer member having a configuration conforming to said lamp unit and forming a ring-like member provided with a front wall located in a plane substantially parallel to a plane passing through said flange, means for maintaining said lamp unit within said retainer member with said aiming pads contacting portions of said front wall of said retainer member to thereby serve as an aiming ring, a level device supported by said retainer member, said retainer member having an enlarged portion that extends radially outwardly from said front wall, said enlarged portion having a part thereof serving as an enclosure for said level device and being provided with an opening that faces forwardly of the vehicle, and said level device being located to the rear of said enlarged portion and having a portion thereof visible through said opening so as to provide a view of the gas bubble in the level device so that proper aim of said lamp unit can be observed from the front of said vehicle.

2. A headlamp assembly adapted to be mounted to a support panel of a vehicle, said headlamp assembly including a rectangular lamp unit formed with a radially outwardly extending flange having three aiming pads formed thereon that define an aiming plane, a rectangular retainer member having a configuration conforming to said lamp unit and comprising a pair of vertically space horizontal sections and a pair of horizontally spaced vertical sections all of which are interconnected to form a ring-like member provided with a front wall located in a plane substantially parallel to a plane passing through said flange, means for maintaining said lamp unit within said retainer member with said aiming pads contacting portions of said front wall of at least two of said sections so as to locate said retainer member in a predetermined position relative to said lamp unit and thereby serve as an aiming ring, a level device supported by said retainer member, one of said sections having an enlarged portion that extends radially outwardly from said front wall, said enlarged portion having a part thereof serving as an enclosure and being provided with an elongated opening that faces forwardly of the vehicle and the major axis of which is substantially parallel to the major axis of said one of said sections, said level device being located to the rear of said enlarged portion and having a portion thereof visible through said elongated opening so as to provide a view of the gas bubble in the level device so that proper aim of said lamp unit can be observed from the front of said headlamp vehicle, and means located between said level device and said one of said sections for making minor adjustments of the position of said level device relative to said retainer member.

3. A headlamp assembly adapted to be mounted to a support panel of a vehicle, said headlamp assembly including a rectangular lamp unit formed with a radially outwardly extending flange provided with an upper vertical surface having three aiming pads formed thereon that define an aiming plane, a rectangular retainer member having a configuration conforming to said lamp unit and comprising a pair of vertically space horizontal sections and a pair of horizontally spaced vertical sections all of which are interconnected to form a ring-like member provided with a front wall located in a plane substantially parallel to a plane passing through said flange, means for maintaining said lamp unit within said retainer member with said aiming pads contacting portions of said front wall of at least two of said sections so as to locate said retainer member in a predetermined position relative to said lamp unit and thereby serve as an aiming ring, a level device supported by said retainer member, one of said sections having an enlarged portion that extends radially outwardly from said front wall, said enlarged portion having a part thereof serving as an enclosure for said level device and being provided with an elongated opening that faces forwardly of the vehicle and the major axis of which is substantially parallel to the major axis of said one of said sections, said level device having a portion thereof located adjacent to and being visible through said elongated opening so as to provide a view of the gas bubble so that proper aim of said lamp unit can be observed from the front of said headlamp vehicle, and screw means located between said level device and said one of said sections for making minor adjustments of the position of said level device relative to said retainer member.

4. The headlamp assembly of claim 2 wherein said enlarged portion includes at least one tang which extends rearwardly from said enlarged portion and cooperates with a screw carried by said level device for making minor adjustments of the position of said level device.

5. The headlamp assembly of claim 4 wherein said tang is provided with a circular hole and said screw has a head that engages said hole and is frusto-conical in configuration.

* * * * *